Aug. 4, 1942.　　　　D. F. DREHER　　　　2,292,024
SPONGE RUBBER ADHESIVE UNIT
Filed July 29, 1940
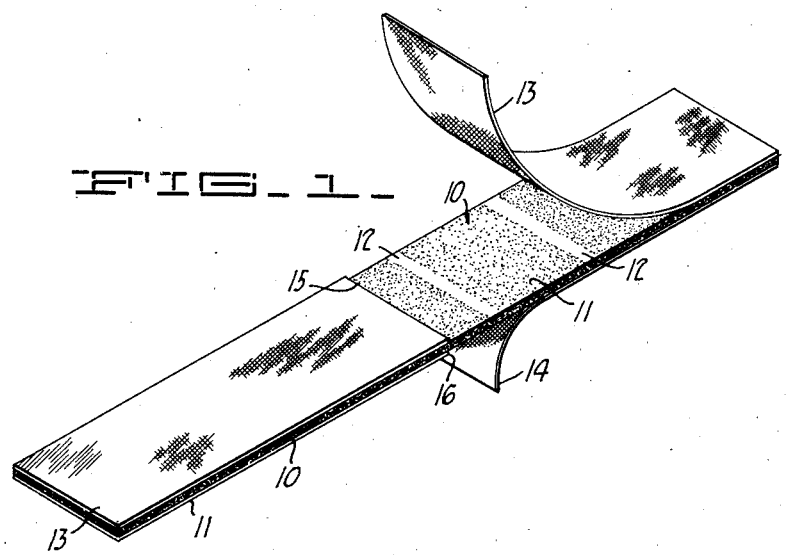
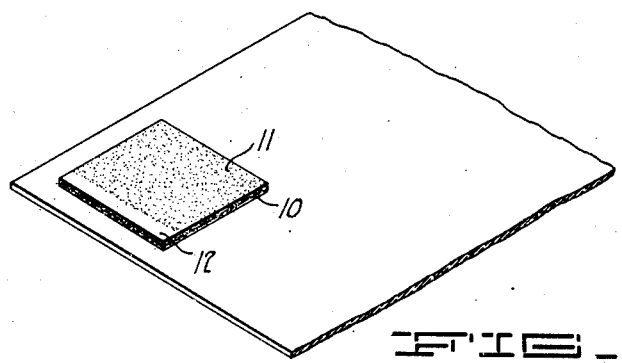
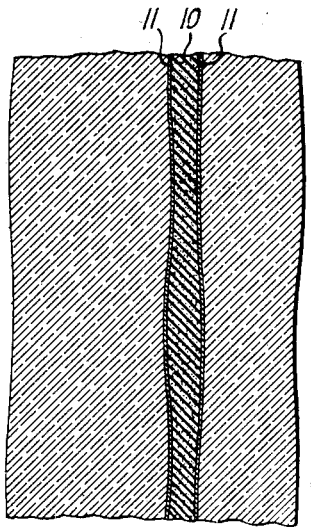
INVENTOR
Donald F. Dreher
BY
ATTORNEY Patented Aug. 4, 1942

2,292,024

UNITED STATES PATENT OFFICE 2,292,024

SPONGE RUBBER ADHESIVE UNIT

Donald F. Dreher, Monterey Park, Calif., assignor, by mesne assignments, to Adhere, Incorporated, a corporation of California Application July 29, 1940, Serial No. 348,185

1 Claim. (Cl. 40—140)

My invention relates to the art of mounting, or supporting advertising display pieces, or the like, on substantially plane surfaces by pressure sensitive adhesives, and more specifically to an improved pressure sensitive adhesive unit for that purpose. The unit herein disclosed is of the type to which the patent to Carpenter 2,030,135 of February 11, 1936, is directed, but contemplates an improved form thereof adapted to a materially wider range of application than is possible with the species disclosed in said patent.

It has been found in practice that when rigid advertising display pieces or the like, cast or otherwise formed of relatively rigid material, are mounted on rigid surfaces, the use of an intermediate pressure sensitive adhesive unit having a paper or other comparatively hard or incompressible base, may result in detachment or self-stripping in some cases, due to the weight of the display piece and the fact that a uniformly strong adhesive bond will not be effected between all portions of the adjacent planar surfaces, but will be largely limited to the more prominent portions of such surfaces.

As an instance of this difficulty, it will be apparent that when a rigid planar piece such as a painted glass plaque or mirror plaque is mounted on a glass window or mirror by a pressure sensitive adhesive, the irregularly undulant character of the rigid surfaces of both makes it impossible to apply sufficient pressure to the entire surface of the interposed pressure sensitive adhesive to render its entire surface uniformly efficient as a supporting medium. Satisfactory efficiency of the adhesive can be obtained, under such circumstances, only at the adjacent "high points" of the rigid surfaces.

Therefore, the principal object of my present invention is to provide a pressure sensitive adhesive unit of the character referred to which will be deformable, or compressible in such manner as to conform to any irregularly undulant rigid surface, whether of glass, metal, or other material, to which it may be applied, thus affording uniform adhesion.

Other objects and advantages of my invention will appear from the following description and illustrative drawing, where:

Figure 1 is a perspective view of a unit embodying a preferred form of my invention, with the edges of the cover strips pulled away to show the construction of the unit;

Figure 2 is a perspective view of the back of one corner of a glass sign or mirror plaque with an adhesive unit in position thereon, ready to be pressed to a supporting surface;

Figure 3 is a section through the planes of a sheet glass sign, or mirror plaque adhesive unit, and portion of a planar glass support, on a magnified scale, illustrating conformation of the unit to the support surface; and Figure 4 is an end view of a modified form of a unit embodying my invention, which is particularly adapted for subdivision and stripping.

I have found that the efficiency of pressure sensitive adhesives varies directly with the flexibility of at least one of the surfaces which are to be secured together by such adhesives, and that in order to attain the foregoing objects it is necessary to interpose between rigid planar surfaces to be secured together by a pressure sensitive adhesive, not only the necessary layer or layers of such adhesive, but also a layer of soft deformable material.

In the practice of my invention, I preferably provide an adhesive unit consisting of a thin piece 10 of soft, compressibly deformable material, preferably sponge rubber, coated on both sides, as indicated at 11, with ever-tacky, pressure sensitive adhesive.

The deformable adhesive strip 10 is normally protected by cover strips 13, 14, held to the opposite surfaces of the strip 10 by its tacky adhesive coating. The strips 13, 14 are preferably of smooth fabric such as Holland cloth, which can be readily stripped from the adhesive strip 10 when it is desired to make use of the same, but certain glassines, treated papers, and cellulosic films having surfaces which do not adhere strongly to the ever-tacky pressure sensitive adhesive, may be used instead of Holland cloth. These cover strips permit handling and packing of the adhesive units without contact with the adhesive material.

When adhesive units are produced as a strip or ribbon, this adhesive may be applied in bands or zones separated by bands 12 free of adhesive to facilitate removal of the cover strips 13 and 14, as well as removal or stripping of the mounted articles when desired, and when so gummed the individual units preferably are cut apart for use at the bands 12.

In the preferred form of the product, however, the adhesive is applied uniformly over the entire area of either a sheet or a strip of the deformable material 10, without providing the ungummed bands 12, and the removal of the cover strips 13 and 14 is facilitated by splitting said cover strips within the area of the sheet or strip 10, as shown in Figure 1, in which it will be noted that the cover strips 13 and the cover strips 14 are separated by such splits 15 and 16.

This form of the product can be fabricated in stock widths of, for instance, twenty inches; the adhesive and the cover strips being applied in such widths to both sides of a sheet of sponge rubber of similar width unrolled from a stock roll. After such lamination the cover strips—but not the sponge rubber—are slit, as at 15, by means of a sharp-edged blade drawn lightly over the surface, which blade when properly set does not damage the sponge rubber beneath. Coincident with this operation the stock roll may be trimmed, or slit apart into narrower widths or cut into sheets, to provide a convenient form of the product from which adhesive units of any desired size or shape can be readily cut. The cover strips can be easily removed from such units by lifting an edge of the split covering which lies within the area of the cut unit and peeling it toward the edge in the manner illustrated in Figure 1.

An alternative cutting of this form of the product may be effected to provide a sheet of the character illustrated in Figure 4 in which the upper cover strip 13 is split along line 15 in the manner described above, and the deformable material 10 and the cover strip 13 are also die cut along lines 17 ordinarily at a right angle to the line 15. The opposite cover strip 14, however, is left entirely uncut and remains in one piece (either in sheet or continuous roll form) from which the individual units may be peeled quite readily. The units thus removed are applied at once to display pieces with the split covering 13 left in place until a display piece is to be mounted on a supporting surface when it is removed in the manner described above in connection with the preferred embodiment. Substantial economies in the production and handling of small size units are made possible by this form of my invention.

The adhesive units are used substantially as are those disclosed in the Carpenter patent above referred to, but as the unit of my present invention is of sponge rubber or similar soft deformable material, firm pressure over the entire surface of the unit when applying it to a supporting surface and prior to removal of the protective covering on the side being pressed, will cause its attaching surface to be molded into conformity with the undulations of an irregular supporting surface, as illustrated by Figure 3, and to adhere thereto without the tendency to separation or self-stripping at the depressed areas inherent with stiffer non-compressible units.

It is desirable in some instances to substitute for one of the two coatings of pressure sensitive adhesive used in the preferred embodiment above described, a coating of an adhesive of different character, such as one requiring moistening. Certain types of advertising display pieces have surfaces to which pressure sensitive adhesives do not readily or strongly adhere, and it is usually desirable to effect a stronger bond between the display piece and the adhesive unit than between the supporting surface and the adhesive unit so as to facilitate transfer of the display piece to other supporting surfaces. Conversely, under some circumstances it may be desirable to effect a stronger bond between the supporting surface and the adhesive unit than between the adhesive unit and the display piece in order to permit the substitution of different display pieces on the same supporting surface. Under such circumstances, any well known adhesive, such as fish glue or the like, or any convenient mechanical means for securing the deformable material of my improved pressure sensitive adhesive unit to one surface, may be used; the pressure sensitive adhesive coating on the opposite face of the material adapting it for attachment to any of a wide variety of other rigid planar surfaces. Only the pressure sensitive adhesive coated face of such forms need be provided with the protective strip hereinbefore referred to.

My invention may be embodied in various shapes and lengths of units without departure from its scope as defined in the following claim, the term "sheet" being used therein without reference to dimensions and as including a strip or ribbon.

I claim as my invention:

An advertising display piece of a degree of rigidity comparable to that of a glass sheet, in combination with means for detachably mounting said display piece on a vertical planar surface of similar rigidity and of irregular undulant character; said means comprising a flat piece of sponge rubber secured to one surface of said advertising piece and having its opposite face coated with a tacky pressure sensitive adhesive, whereby the sponge rubber will conform to the irregularly undulant rigid surface to render its entire surface uniformly efficient as a supporting medium.

DONALD F. DREHER.